July 6, 1926.

C. A. BORNMANN 1,591,697

WINDING KEY

Filed Feb. 16, 1926

INVENTOR
CARL A. BORNMANN,
BY
ATTORNEY.

Patented July 6, 1926.

1,591,697

UNITED STATES PATENT OFFICE.

CARL A. BORNMANN, OF BINGHAMTON, NEW YORK, ASSIGNOR TO ANSCO PHOTO-PRODUCTS, INC., OF BINGHAMTON, NEW YORK.

WINDING KEY.

Application filed February 16, 1926. Serial No. 88,592.

My invention relates to winding keys for cameras, and is directed particularly to a novel means for housing the various parts of the key in a manner to occupy a minimum amount of space within the camera body. My improved structure is especially adaptable to camera bodies formed entirely of metal.

The primary object of my invention is to provide a cup member for receiving the means for preventing the turning of the key in one direction, and being so formed as to also provide a recess into which the web of the key stem may be drawn.

Another object is to utilize such cup construction as a spacer for the film spool placed in the camera.

Still another object is to provide in combination a winding key housing and a spool pin housing which form a properly aligned and spaced spool supporting means.

Other objects and advantages in details of construction and operation will be apparent as the description proceeds reference being had to the accompanying drawings wherein like reference numerals indicate like parts.

In the drawings:—

Figure 1:
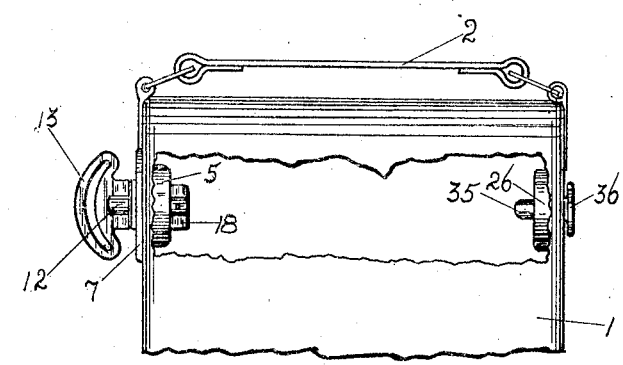
Figure 1 is a side view of one end of a camera illustrating my improved key and spool pin secured thereto, with parts being broken away for clearness of illustration.

The reference numeral 1 indicates generally the body of a photographic camera provided with the usual carrying handle 2. The camera shown is preferably of the metal type although it will be understood that my invention is applicable to other types as well.

One side 3 of the camera is recessed as at 4 to receive a cup or housing 5 provided with a peripheral flange 6 adapted to lay flat against the side 3 on the outside of the camera, the cup 5 projecting through into the camera.

A flanged washer 7 is fitted against the outside of side 3 and covers the opening 4 and the external flanges 6 of the cup 5. Rivets 8, or other suitable means are provided through the washer 7, flange 6, and side 3, securely holding these parts in position on the camera.

Figures 2, 3:
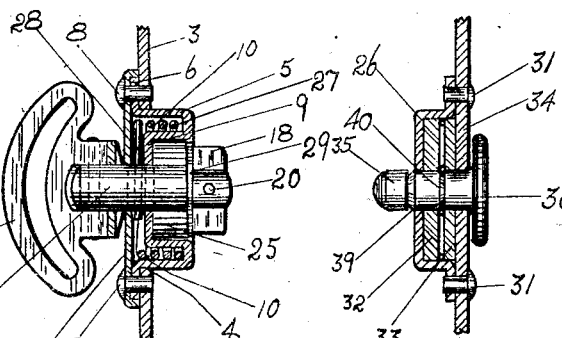
Figure 2 is a detail view of my improved key shown partly in cross section.
Figure 3 is a detail of the film spool pin located in the camera opposite the winding key, the two units providing a properly aligned and spaced rotatable support for a spool.
Figure 4:
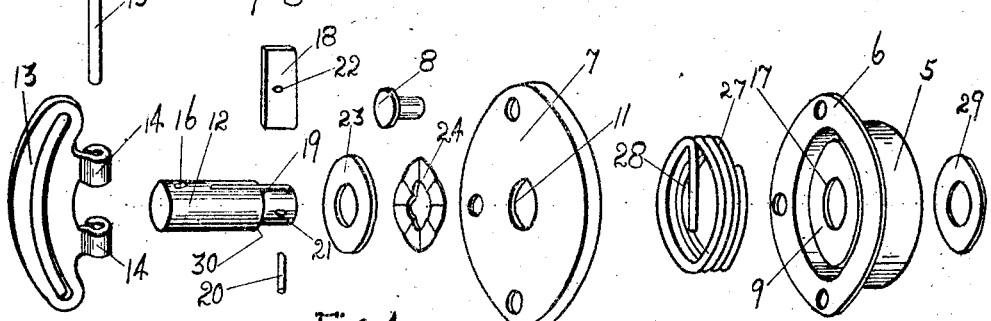
Figure 4 is an exploded perspective view of the various parts comprising my improved key showing them in their relative positions.
Figure 5:
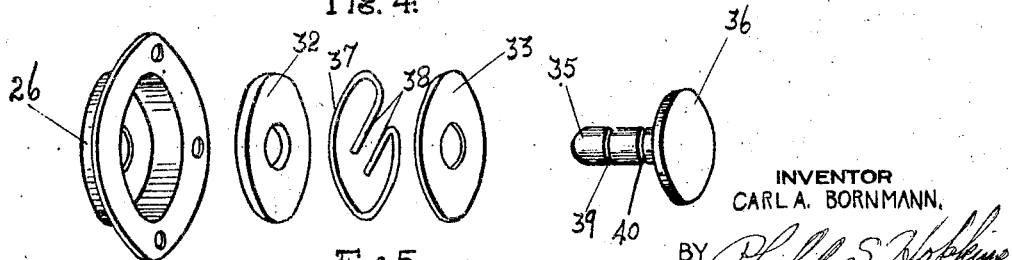
Figure 5 is a similar view of the parts of the spool pin shown in Figure 3.

As illustrated clearly in Figure 2, the bottom of the cup 5, is turned inwardly upon itself as at 9 providing the seat or recess 10 between the inner and outer side walls of the cup. The washer 7 is apertured centrally as at 11 to receive the stem 12 of a winding key provided on its outer end with the finger piece 13 pivotally secured to the stem by means of the bearings 14 engageable on either side of the stem, and the pin 15 passing through said bearing and through the opening 16 in the stem 12.

The stem passes also through a central opening 17 in the bottom portion 9 of the cup 5. The inner end of the stem is provided with the web 18 mounted within the slot 19 by means of the pin 20 passing through the opening 21 in the stem and the opening 22 in the web. A washer 23 encircles the stem 12 adjacent the bearings 14 on the finger piece 13, and a spring washer 24 lies between the washer 23 and the flanged cover member 7. This spring washer 24 thus provides a tension on the key which prevents its accidental turning. It will be clear from Figure 2 that the key stem 12 may be moved in and out a limited distance through the side wall 3 of the camera to permit the insertion of the usual film spool (not shown). The circular recess 25 defined by the bottom 9 of the housing is of such diameter and depth as to permit the web 18 being drawn into it for the insertion of such film spool between the housing 5 and the cup 26 of a spool pin construction located on the opposite side of the camera from said key.

In the space 10 defined between the outer and inner walls of the key housing 5, is a coil spring 27, one end 28 of which is bent at right angles across the diameter of the spring and engages within the slot 19 in the stem 12. Obviously this construction permits the turning of the key in one direction, but if an attempt is made to turn it in the opposite direction, the tendency is to open the coils of the spring 28 which, bearing against the outer wall of the housing 5, bind against said wall and prevents such turning. A washer 29 is secured adjacent the end of the stem 12 between the inner edge of the web 18 and a shoulder 30 cut on said stem, which washer limits the outward movement of the stem by engaging against the inner wall of the bottom 9. This washer also lies flush with the circular side wall of the housing 5 and forms an endwise abutment against which the end of the film spool may extend.

Reference has been made to the spool pin construction on the opposite side of the camera directly opposed to the key just described. This construction includes the cup or housing 26 riveted or otherwise secured to the side of the camera as at 31, there being the washers 32 and 33 between the closed end of the housing 26 and the side 34 of the camera. These washers, the cup 26 and the side walls of the camera are apertured centrally to permit the spool pin 35 to be inserted therethrough. A thumb piece 36 is provided on the outer end of the pin.

A single coil of spring wire 37, having its ends turned inwardly as at 38, is received between the washers 32 and 33. The pin 35 is grooved circumferentially as at 39 and 40, the adjacent edges of said grooves being bevelled and the opposite edges thereof being cut to form straight shoulders. The ends 38 of the spring 37 are adapted to engage in one or the other of the grooves and due to the aforementioned bevelled edges of said grooves, it will be obvious that the spool pin may be moved outwardly and inwardly an extent equal to the distance between said grooves.

The housing 26 of the spool pin construction and the housing 5 of the winding key thus present directly opposed surfaces in the sides of the camera properly spaced for receiving the film spool with the winding key withdrawn to its outermost position, that is with the web 18 occupying the recess 25 within the housing 5 and the spool pin 35 withdrawn so that the spring 37 lies within the groove 39, it will be clear that a film spool of the ordinary type may be inserted between these two elements which are then positioned inwardly to engage in the appropriate openings in the end of the spool.

It will be observed that the foregoing construction and arrangement makes it possible to provide a metal camera which necessarily has very thin walls, with an efficient spool holding and turning device which occupies a minimum amount of space within the camera and which at the same time defines the proper positioning and spacing of the spool within the camera.

It will be obvious from the foregoing, that many changes in details of construction and arrangement of the parts just described may be made without departing from the scope of the invention. I do not limit myself therefore to the exact structure disclosed other than by the appended claims.

I claim:

1. A winding key comprising a housing, a stem passing through said housing, a web on said stem, a walled recess in said housing to receive said web therein, and means encircling the wall of said recess and engageable with said stem for permitting rotation of said stem in one direction only.

2. A winding key comprising a housing, a stem passing through said housing, a web on said stem, one side of said housing being turned inwardly upon itself to provide a recess for receiving said web therein, and means lying between the outer side wall of said housing and the side wall of said inturned portion and engaging said stem for permitting rotation of said stem in one direction only.

3. In combination with a camera, a housing secured to one side thereof, a stem passing through said housing and provided on its inner end with a web, the inner wall of said housing being formed inwardly upon itself providing a recess for receiving said web, the wall of said inturned portion being spaced from the outer wall of said housing, and means between said spaced walls and engaging said stem for permitting rotation of said stem in one direction only.

4. In combination with a camera, a housing secured to one side thereof and projecting within said camera, the inner projecting side of said housing being turned back upon itself to provide a recess, a stem passing through said housing and having a web on its inner end engageable within said recess, and means within said housing and said camera and engaging said stem for permitting rotation of said stem in one direction only.

5. In combination with a camera, a housing secured thereto and projecting inwardly through one side thereof, the inner projecting side of said housing being turned back upon itself forming spaced double side walls and a recess within said camera, a stem passing through said housing and provided at its inner end with a web engageable in said recess, and means between said spaced side walls and engaging said stem to permit said stem to turn in one direction only.

6. In combination with a camera, a housing secured thereto and projecting inwardly through one side thereof, the inner projecting side of said housing being turned back upon itself forming spaced double side walls and a recess within said camera, a stem passing through said housing and provided at its inner end with a web engageable in said recess, and a coil spring between said spaced side walls having one end turned across its diameter and engaging said stem whereby said stem may be rotated in one direction only.

7. In combination with a camera, a housing secured thereto and projecting inwardly through one side thereof, the inner projecting side thereof being turned back upon itself to provide a recess, a stem slidably and rotatably mounted in said housing and having a web on its inner end engageable within said recess, a second housing on the opposite side of said camera in alignment with said key housing and projecting inwardly, a pin slidable through said housing, said housings forming a spaced support for a spool.

CARL A. BORNMANN.